(12) United States Patent
Lahrman

(10) Patent No.: US 8,403,334 B2
(45) Date of Patent: Mar. 26, 2013

(54) MULTI-RAIL PISTON RING

(75) Inventor: John C. Lahrman, Muskegon, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 684 days.

(21) Appl. No.: 12/349,846

(22) Filed: Jan. 7, 2009

(65) Prior Publication Data

US 2010/0171273 A1   Jul. 8, 2010

(51) Int. Cl.
F02F 5/00 (2006.01)
F16J 9/00 (2006.01)
F16J 15/00 (2006.01)

(52) U.S. Cl. .......................... 277/434; 277/435; 277/500

(58) Field of Classification Search .......... 277/434–435, 277/500
See application file for complete search history.

(56) References Cited

U.S. PATENT DOCUMENTS

| | | | | |
|---|---|---|---|---|
| 2,424,881 A * | 7/1947 | Fall | ................................ | 277/473 |
| 2,459,395 A * | 1/1949 | Smith | ............................ | 277/460 |
| 2,589,154 A * | 3/1952 | Smith | ............................ | 277/451 |
| 2,789,022 A * | 4/1957 | Olson | ............................ | 277/481 |
| 2,859,079 A * | 11/1958 | Olson | ............................ | 277/477 |
| 3,771,801 A * | 11/1973 | Burke | ............................ | 277/584 |
| 5,328,177 A * | 7/1994 | Lair et al. | ....................... | 277/311 |
| 5,469,616 A | 11/1995 | Miyazaki et al. | | |
| 5,564,699 A * | 10/1996 | Lawrence et al. | .............. | 277/497 |
| 6,161,468 A * | 12/2000 | Hamelink | ......................... | 92/253 |
| 6,267,380 B1 * | 7/2001 | Feistel | ............................. | 277/309 |
| 7,306,232 B2 * | 12/2007 | Fiedler | ............................ | 277/434 |
| 7,311,182 B2 * | 12/2007 | Nevoigt et al. | ........... | 188/322.17 |
| 7,883,094 B2 * | 2/2011 | Vila | ............................... | 277/508 |
| RE42,654 E * | 8/2011 | Zitting | ............................ | 277/435 |
| 2006/0113730 A1 | 6/2006 | Suzuki et al. | | |

FOREIGN PATENT DOCUMENTS

| | | |
|---|---|---|
| JP | 58-20952 | 2/1983 |
| JP | 63-021353 A | 1/1988 |
| JP | 63/057853 A | 3/1988 |
| JP | 06/094129 A | 4/1994 |
| JP | 09/144881 A | 6/1997 |
| JP | 09/196173 A | 7/1997 |
| JP | 2003/286899 A | 10/2003 |
| JP | 2007/170455 A | 7/2007 |

* cited by examiner

*Primary Examiner* — Vishal Patel
(74) *Attorney, Agent, or Firm* — Rader, Fishman & Grauer PLLC

(57) ABSTRACT

A piston ring assembly includes a ring or rail defining a seal surface configured to seal against a piston bore surface of an engine. The seal surface defines a radially outer periphery. The oil control rail assembly further includes two positioning rings. A first one of the positioning rings is disposed axially above the oil control rail and a second one of the positioning rings is disposed axially below the oil control rail. Each of the positioning rings defines an outermost periphery of the positioning ring that is disposed radially inward with respect to the seal surface of the oil control rail. The outermost peripheries of the positioning rings thus generally do not contact a bore surface that is contacted by the seal surface of the oil control rail.

11 Claims, 4 Drawing Sheets

MULTI-RAIL PISTON RING

TECHNICAL FIELD

The present disclosure relates to a piston for an internal combustion engine, and lubrication systems for pistons.

BACKGROUND

Piston ring seals are generally seated in a groove formed in the outer circumference of a piston and perform at least two functions to ensure efficient operation of the engine. First, during the power cycle, the ring seals prevent gases under high pressure from bypassing the piston. Thus, maximum driving force is applied to the piston. Second, on the return stroke, the ring seals prevent lubricants from entering the combustion chamber. If the ring seals fail to perform efficiently, the engine will not develop the maximum power due to "blow-by" on the power cycle. Additionally, if the ring seals leak during the return stroke, lubricants will enter the combustion chamber, thereby reducing combustion efficiency and increasing air pollution by way of the exhaust cycle. Generally, the ring seal provides the interface between the piston and the cylinder wall. Accordingly, the general configuration of the ring seal at least partially determines the friction between the piston assembly and the surfaces of the engine bore during operation. Further, this frictional characteristic influences efficiency of the engine, such that reduced friction generally leads to increased fuel economy.

One known piston ring design includes two separate piston rings that contact the engine bore surface to provide a seal. While the provision of two piston rings allows for enhanced sealing against the bore surface, the use of two separate rings also necessarily increases the amount of friction against the bore surface.

Accordingly, there is a need for a piston ring design that provides reduced friction between the piston assembly and the engine bore surfaces while maintaining an adequate seal between the piston and the bore surfaces.

DETAILED DESCRIPTION

Figure 1:
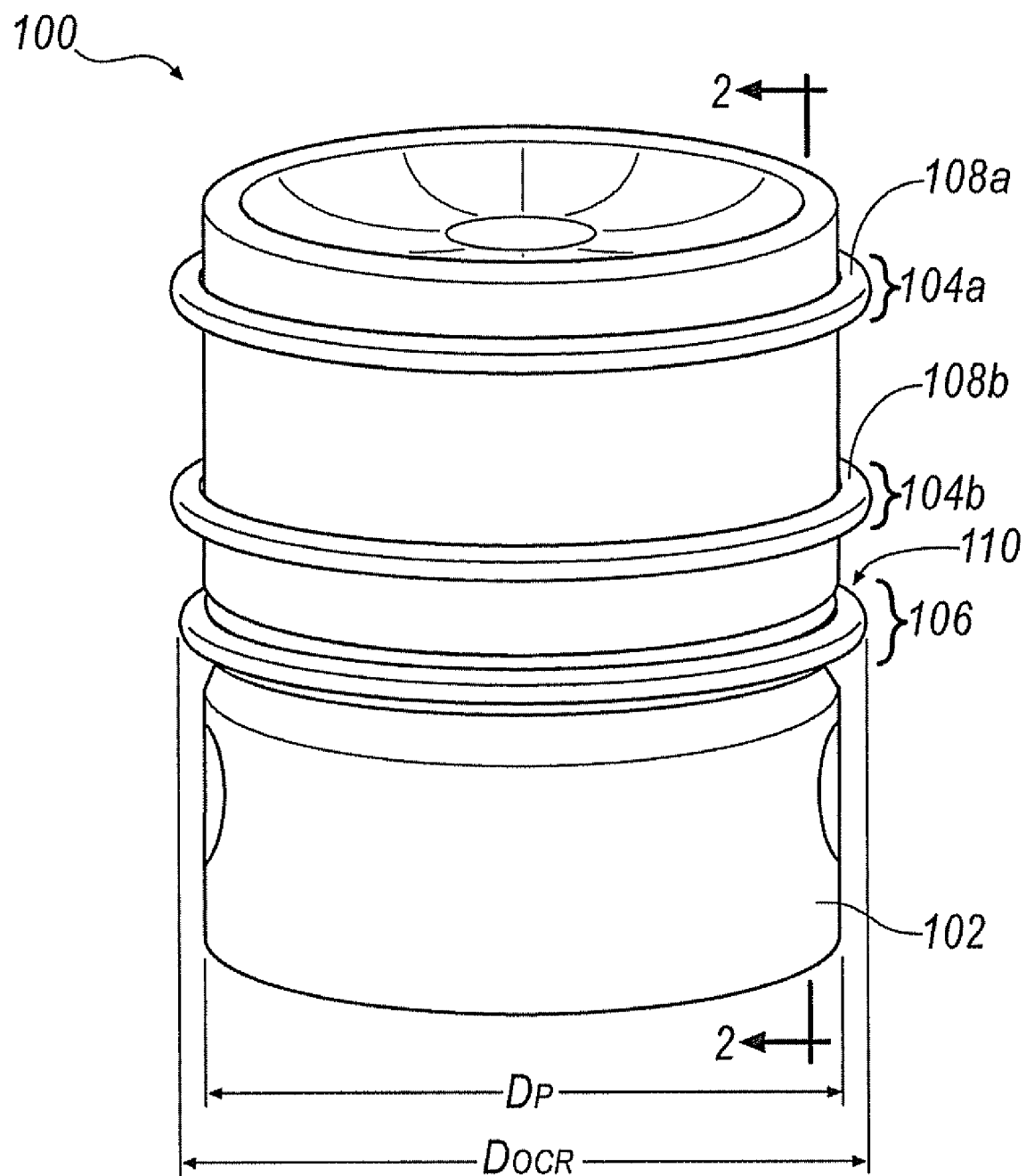
FIG. 1 is a perspective view of an exemplary piston assembly.

While the claims are not limited to the illustrated examples, an appreciation of various aspects is best gained through a discussion of various examples thereof. Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain an innovative aspect of an example. Further, the descriptions set forth herein are not intended to be exhaustive or otherwise limit or restrict the claims to the precise forms and configurations shown in the drawings and disclosed in the following detailed description.

Moreover, there are a number of constants introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

According to various exemplary illustrations, a piston ring assembly is disclosed that that may selectively received within an outer circumferentially disposed groove of a piston main body. The piston ring assembly includes an oil control rail or split ring selectively disposed within the groove. The oil control rail defines a seal surface configured to seal against a piston bore surface of an engine. The seal surface defines a radially outer periphery. The piston assembly further includes an expander that is selectively disposed within the circumferentially disposed groove. The expander is configured to push the oil control rail radially outward to contact the piston bore surface. The oil control rail assembly further includes two positioning rings. A first one of the positioning rings is disposed axially above the oil control rail and a second one of the positioning rings is disposed axially below the oil control rail. Each of the positioning rings defines an outermost periphery of the positioning ring that is disposed radially inward with respect to the seal surface of the oil control rail. The outermost peripheries of the positioning rings thus generally do not contact the bore surface.

Figure 2:
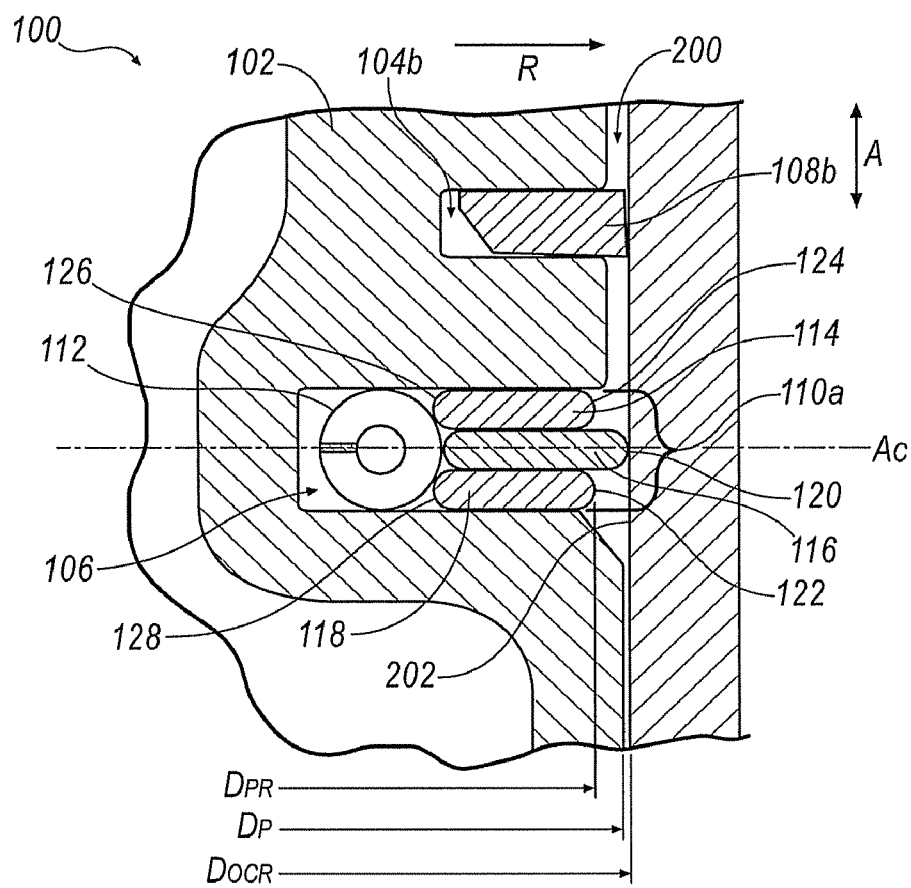
FIG. 2 is a fragmentary, sectional view of the piston assembly shown in FIG. 1.

Turning now to FIGS. 1 and 2, an exemplary illustration of a piston assembly 100 is shown. Piston assembly 100 may be received within bore 200 of an engine block defining a bore surface 202. Piston assembly 100 includes a main body 102. The main body 102 includes a two outer circumferentially disposed upper grooves 104a, 104b that receive upper piston rings 108a, 108b, respectively. Main body 102 also includes a second outer circumferentially disposed groove 106 receiving an oil control rail assembly 110. Although three grooves 104a, 104b, 106 are shown receiving respective piston rings 108a, 108b and oil control rail assembly 110, any number of grooves may be provided in piston main body 102 that is convenient.

A piston ring assembly, or oil control rail assembly 110a, may include a split coil expander 112, a split upper positioning ring 114, a split oil control rail 116, and a split lower positioning ring 118. Each of the positioning rings 114, 118, the coil expander 112, and the oil control rail 116 may generally extend about an entire periphery of the piston main body 102 after installation. As shown in FIGS. 1 and 2, upper positioning ring 114 is disposed above the oil control rail 116 in an axial direction, i.e., in a direction generally coinciding with the travel of the piston during operation, as represented in FIG. 2 by arrow A. The lower positioning ring 118 is disposed axially below the oil control rail 116. The oil control rail 116 may thus be selectively disposed within groove 106 between the upper and lower positioning rings 114, 118.

Oil control rail 116 includes a seal surface 120 configured to seal against the piston bore surface 202. Seal surface 120 defines a radially outer periphery having a diameter $D_{OCR}$, as best seen in FIGS. 1 and 2. The expander 112 is disposed with the groove 106 and is configured to generally push, engage or otherwise encourage the oil control rail 116 radially outward, thereby generally maintaining seal surface 120 against piston bore surface 202. Seal surface 120, by maintaining contact with piston bore surface 202, may thus generally prevent lubricants such as oil, e.g., from an engine crankcase, from escaping upwards into the combustion chamber. Further, the seal surface 120 may scrape lubricants from the bore surface 202, allowing the lubricant to return to the engine crankcase (not shown), e.g., via an annular passage about the piston main body 102 or through vents (not shown) leading into the interior of the piston main body 102. As shown in FIGS. 1 and 2, the seal surface 120 may be generally radiused. Alternatively, the seal surface 120 may be generally flat, and may be aligned parallel to the bore surface 202 or may be slightly misaligned with respect to the bore surface 202, as further described below.

Each of the positioning rings 114 and 118 define an outermost periphery that is disposed radially inward in relation to the seal surface 120, as best seen in FIG. 2. A radial direction may be generally normal with respect to the axial travel of the piston main body 102, as represented by arrow R in FIG. 2. The positioning rings 114, 118 may define an outer diameter $D_{PR}$, as best seen in FIG. 2. Further, this outer diameter is less than the outer diameter $D_{OCR}$ of the oil control rail 116, and may even be less than an outer diameter of the piston main body 102, represented in FIGS. 1 and 2 as $D_P$. Thus, the only portion of the oil control rail assembly 110 that contacts piston bore surface 202 is the seal surface 120 of oil control rail 116. Seal surface 120 of oil control rail 116 may be relatively thin or otherwise define a small axial height, thus generally reducing the amount of friction between oil control rail 116 and bore surface 202. Despite the reduced friction offered by the smaller axial height of seal surface 120, loading of the rail 116 against the bore surface 202 is generally a function of the expansion force that directs the rail 116 generally radially outward against the bore surface 202. Accordingly, the oil control rail 116 provides an adequate seal against the bore surface 202 despite the reduced surface area, e.g., of seal surface 120, presented to the bore surface 202.

Despite the reduced axial height of oil control rail 116 and/or seal surface 120, positioning rings 114 and 118 generally position the oil control rail 116 properly to allow adequate sealing and prevention of oil from escaping past the oil control rail assembly 110. Positioning rings 114 and 118 may each include a radially inward surface 126 and 128 that engage the coil expander 112. Accordingly, position rings 114 and 118 generally position the coil expander 112 and the oil control rail 116, at least in an axial direction, to position the seal surface 120 against bore surface 202.

FIGS. 1 and 2 illustrate one approach for positioning the oil control rail 116 and/or seal surface 120, where the oil control rail 116 is positioned in a generally axially middle portion of the groove 106. As shown in FIGS. 1 and 2, the positioning rings 114 and 118 may have a generally equal axial height such that the oil control rail 116 is positioned generally in the middle of the groove 106 in an axial direction. Further, the oil control rail 116 itself may have an axial height generally equal to that of the positioning rings 114, 118. While the oil control rail 116 need not have an identical or even similar axial height in order to position the oil control rail 116 in the generally middle axial portion of the groove 106, this may allow economies of scale in the production of the positioning rings 114, 118 and the oil control rail 116. In other words, so long as positioning rings 114 and 118 define a generally identical axial height, oil control rail 116 and seal surface 120 may be positioned generally centrally within groove 106 in an axial direction.

Figure 3:
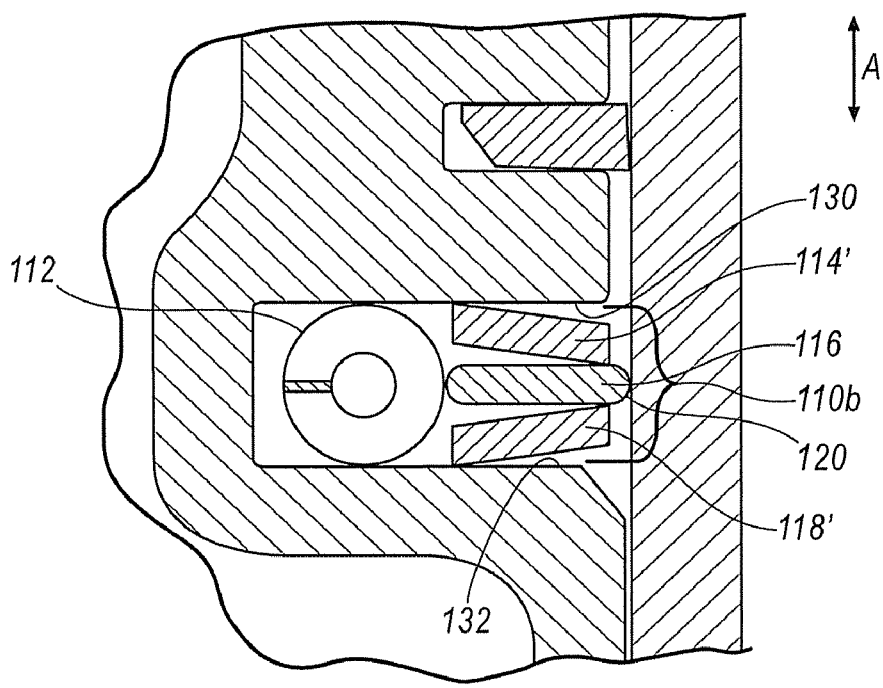
FIG. 3 is a fragmentary, sectional view of another exemplary piston assembly.

Turning now to FIG. 3, another exemplary illustration of a piston ring assembly or oil control rail assembly 110b is shown. Oil control rail assembly 110b includes positioning rings 114' and 118' that each define a dished or conical profile. In other words, each of the positioning rings 114' and 118' are generally angled such that they take up axial height or clearance within groove 106. As an example, each of the positioning rings 114' and 118' may be a Belleville-type washer. The positioning rings 114' and 118' thus may generally cooperate with the oil control rail 116 to apply a force in an axial direction. The axially directed force may generally act upon an upper lateral surface 130 and a lower lateral surface 132 within the groove 106. The dished or conical profile of the rings 114' and 118' thus takes up axial clearance that may exist between any of the positioning rings 114' and 118', oil control rail 116, and the upper and lower lateral surfaces 130, 132 of groove 106. Oil control rail 116 may thus further be encouraged to remain in a generally axially middle portion of groove 106. Although each positioning ring 114', 118' is shown having a dished or conical profile, only one of the positioning rings 114', 118' may have a conical profile if desired. Further, one or both positioning rings 114', 118' may be biased in an upward or downward direction. For example, as shown in FIG. 3, the upper positioning ring 114' is biased downward, i.e., the cross-section of the upper positioning ring 114' generally slopes downward in a direction moving from the inner diameter of the ring 114' to the outer diameter of the ring 114'. The lower positioning ring 118' is shown in FIG. 3 biased upward, i.e., the cross-section of the lower positioning ring 118' generally slopes upward in a direction moving from the inner diameter of the ring 118' to the outer diameter of the ring 118'.

Figure 4A:
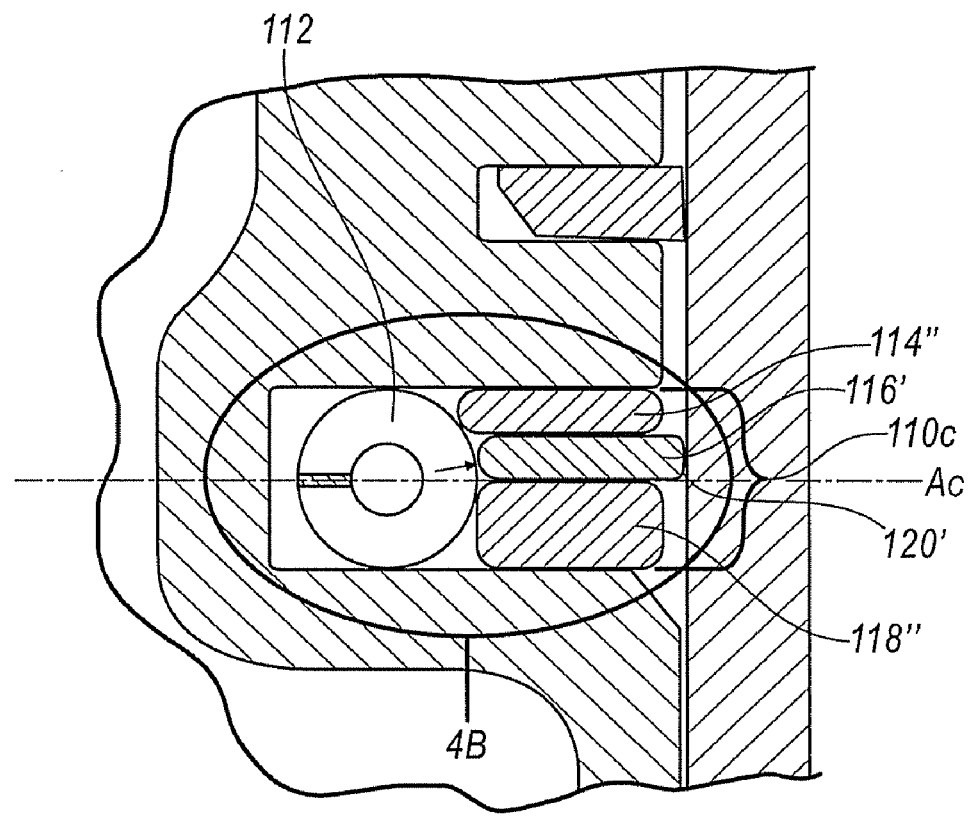
FIG. 4A is a fragmentary, sectional view of another exemplary piston assembly.
Figure 4B:
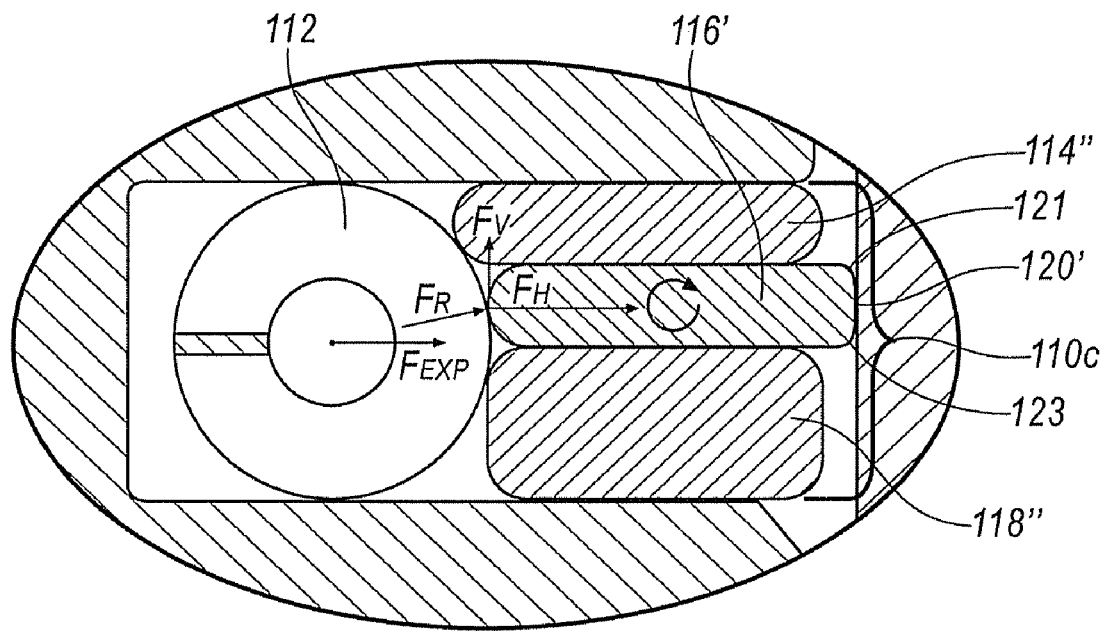
FIG. 4B is a closeup view of area 4B shown in FIG. 4A.

Turning now to FIGS. 4A and 4B, another exemplary illustration of an oil control rail assembly 110c is shown. In contrast to the examples described above in regard to FIGS. 1-3, the axial heights of positioning rings 114" and 118" are not equal. As viewed in an axial direction, upper positioning ring 114" is shown with a shorter axial height than lower positioning ring 118". Accordingly, oil control rail 116' is generally offset from the axial center of the groove 106, as represented in FIG. 4A by dashed line $A_C$, and is thus also offset axially with respect to the expander 112. Further, oil control rail 116' may have a seal surface 120' that is generally flat along at least a portion of the axial height of the seal surface 120', and generally about the entirety of the periphery of the oil control rail 116'. As best seen in FIG. 4B, when oil control rail 116' is engaged by the expander 112, e.g., when the oil control rail 116' is pushed against the coil expander 112 by the bore surface 202, an outward radial force enacted by the expander 112 includes both a vertical and a horizontal component as applied to oil control rail 116'. In other words, coil expander 112 moves radially outward within groove 106 according to a force $F_{EXP}$, applying a force $F_R$ against the oil control rail 116 that is generally normal to an outer periphery of the coil expander 112. $F_R$ thus has a horizontal component $F_H$ and a vertical component $F_V$ that are each applied to the oil control rail 116'. The vertical component of the force $F_V$ applied to the oil control rail 116' generally causes a small rotation (clockwise as viewed in FIGS. 4A and 4B), thus misaligning seal surface 120' slightly with respect to bore surface 202. Accordingly, as shown in FIG. 4B, an upper edge or corner 121 of seal surface 120' will tend to scrape along bore surface 202 while the lower edge of seal surface 120' may be generally brought out of contact with bore surface 202. The example shown in FIG. 4B thus generally allows enhanced scraping of oil from bore surfaces when the piston is traveling upwards, i.e. during an exhaust stroke of a piston.

In yet another exemplary illustration, the axial height of upper positioning ring 114 is generally greater than the axial height of lower positioning ring 118, such that the vertical component of the force enacted by coil expander 112 upon the oil control rail 116' will generally encourage an upper edge of seal surface 120', e.g., corner 121, out of engagement with bore surface 202 while a lower edge of seal surface 120', e.g., corner 123, is encouraged into engagement with bore surface 202. This may allow enhanced scraping of oil from bore surface 202 during a downward, i.e. power stroke, of the piston.

Figure 5:
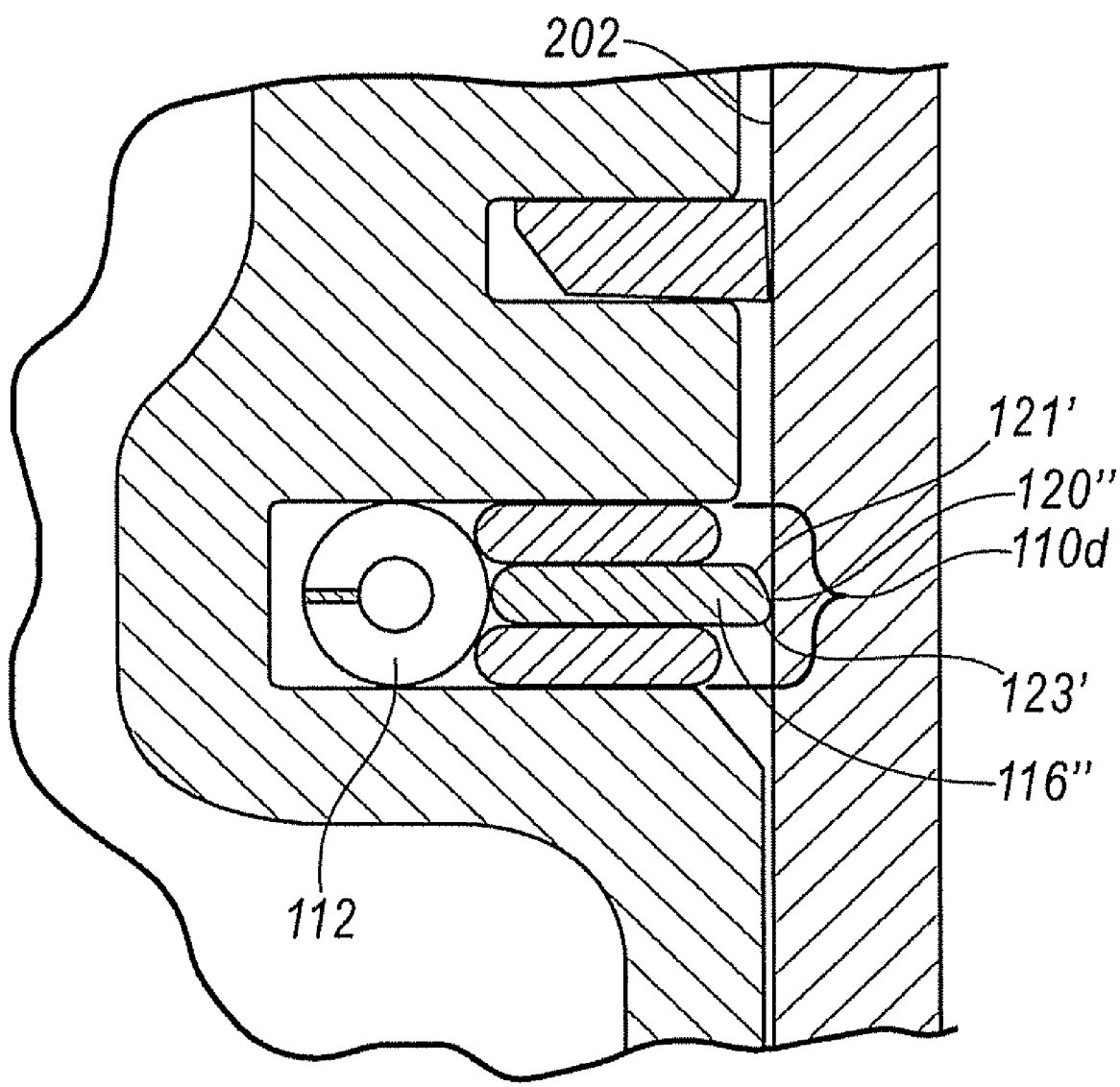
FIG. 5 is a fragmentary, sectional view of another exemplary piston assembly.

Turning now to FIG. 5, yet another exemplary illustration of an oil control rail assembly 110*d* is shown. In this example, oil control rail assembly 110*d* includes a seal surface 120" that is tapered or generally non-parallel with respect to bore surface 202. In other words, an upper corner 121' of the seal surface 120" is generally not in contact with the bore surface 202, while a lower corner 123' of the seal surface 123'. The lower corner 123' of the seal surface 120" is thus generally the only portion of the rail 116" that contacts the bore surface 202, resulting in a more aggressive "scraping" of the rail 116" of the seal surface 120" against the bore surface 202 during operation. While the seal surface 120" is shown tapered such that only the lower corner 123' contacts the bore surface 202, the seal surface 120" may instead be tapered in an opposite direction, i.e., such that the upper corner 121' contacts the bore surface 202 and the lower corner 123' generally does not contact the bore surface 202.

Any other of variety of enhancements or modifications may be made to oil control rail 116 and/or positioning rings 114, 118 that may be convenient. For example, coatings or treatments may be applied to the oil control rail 116 on an outer surface, e.g. seal surface 120, and/or an inner surface engaging the coil expander 112, to reduce wear of the surfaces of the oil control rail 116 due to friction and/or contact with the bore surface 202 and/or coil expander 112.

The exemplary illustrations described herein thus provide a piston assembly that reduces friction at an interface between the piston and engine bore surfaces adjacent the piston, i.e., an oil control rail assembly of the piston, by reducing the overall surface area of a sealing surface. Further, the illustrations provide various ways of optimizing the sealing performance of the interface for increased sealing performance during upward or downward strokes of the piston.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston, comprising:
   a piston body defining an outer circumferentially disposed groove; and
   a piston ring assembly, including:
      an oil control rail disposed within said piston groove and including a seal surface configured to seal against a piston bore surface of an engine, said seal surface defining a radially outer periphery;
      a coil expander disposed in said groove, a radially innermost portion of said coil expander spaced radially outwardly from a radially inner surface of said outer circumferentially disposed groove, said coil expander configured to push said oil control rail radially outward to contact the piston bore surface when the piston is received within the piston bore surface; and
      two positioning rings, a first one of said positioning rings disposed axially above said oil control rail, a second one of said positioning rings disposed axially below said oil control rail, each of said positioning rings defining an outermost periphery of the positioning rings, said outermost peripheries disposed radially inward in relation to said seal surface;
   wherein said positioning rings each include a radially inward surface directly engaging said coil expander.

2. The piston of claim 1, wherein at least one of said positioning rings defines a conical profile.

3. The piston of claim 2, wherein said positioning rings cooperate with said oil control rail to apply an axial force against an upper lateral surface within the outer circumferentially disposed groove and a lower lateral surface within the outer circumferentially disposed groove when said piston ring assembly is disposed within the outer circumferentially disposed groove.

4. The piston of claim 1, wherein said first one of said positioning rings defines a first axial height and said second one of said positioning rings defines a second axial height, said first and second axial heights being generally equal.

5. The piston of claim 4, wherein said oil control rail defines a third axial height, said third axial height being generally equal to said first and second axial heights.

6. The piston of claim 1, wherein said first one of said positioning rings defines a first axial height and said second one of said positioning rings defines a second axial height, said first and second axial heights being different.

7. The piston of claim 1, wherein said coil expander is configured to apply a force having an axial component to said oil control rail when said oil control rail abuts said coil expander.

8. The piston of claim 1, wherein said oil control rail defines a cross sectional profile, said cross sectional profile tapering in a direction radially outward with respect to said piston body.

9. The piston of claim 1, wherein said outermost peripheries of said positioning rings are spaced radially inwardly from a radially outer surface of the piston body.

10. The piston of claim 1, wherein said two positioning rings include an upper positioning ring and a lower positioning ring spaced apart by said oil control rail, the upper and lower positioning rings independently contacting said coil expander on opposite sides of said oil control rail.

11. The piston of claim 1, wherein the coil expander defines an arcuate profile such that the radially inward surfaces of the two positioning rings each engage the coil expander at respective positioning ring radial positions and the oil control rail contacts the coil expander at an oil control ring radial position when the piston is received within the bore, the positioning ring radial positions each disposed radially inwardly of the oil control ring radial position along the arcuate profile.

* * * * *